Figure 1:
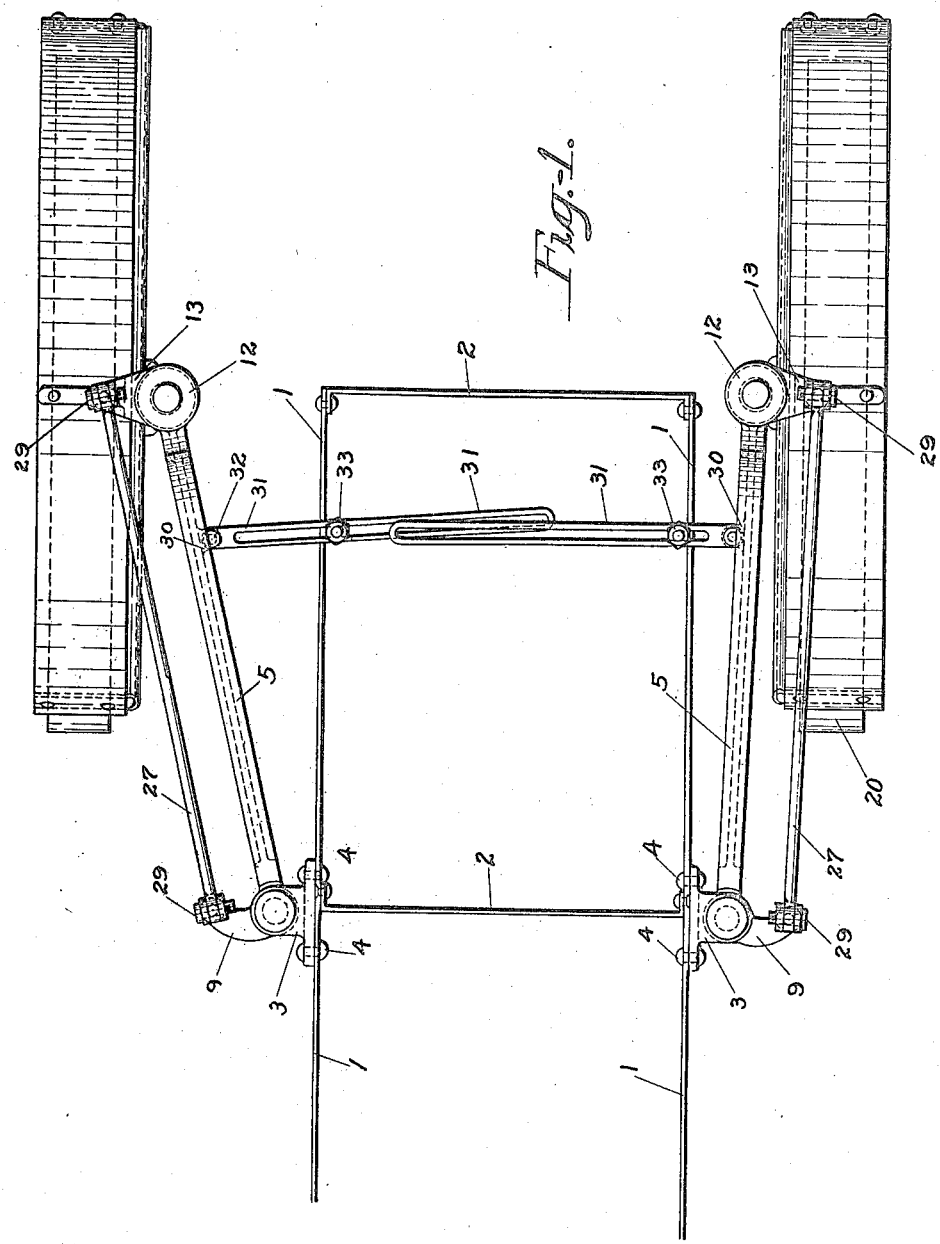

O. A. HOLLIS.
RUNNING GEAR.
APPLICATION FILED FEB. 19, 1918.

1,302,489.

Patented Apr. 29, 1919.
3 SHEETS—SHEET 1.

WITNESSES.
Walter H. Roe

INVENTOR. Otis A. Hollis
BY Jo. Baily Brown
HIS ATT'Y

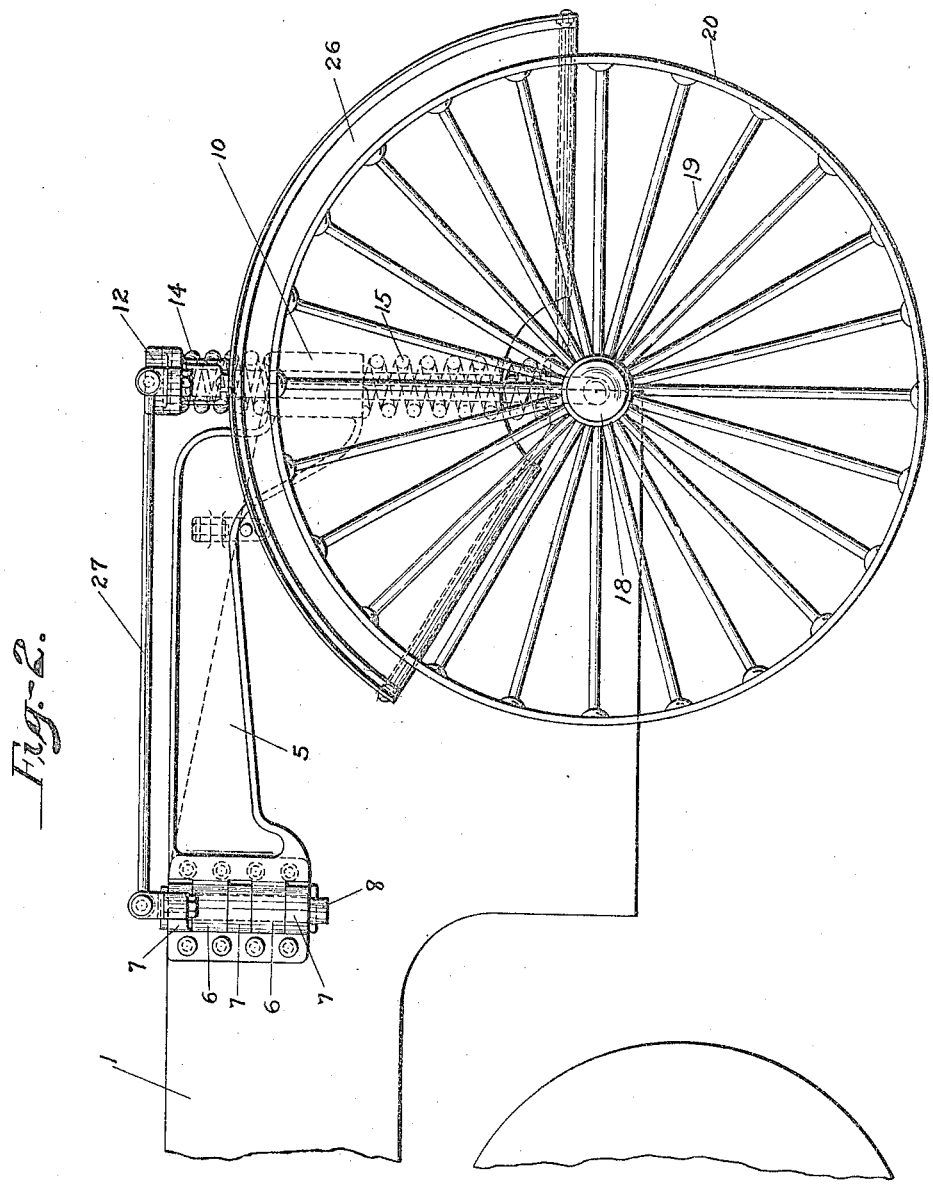

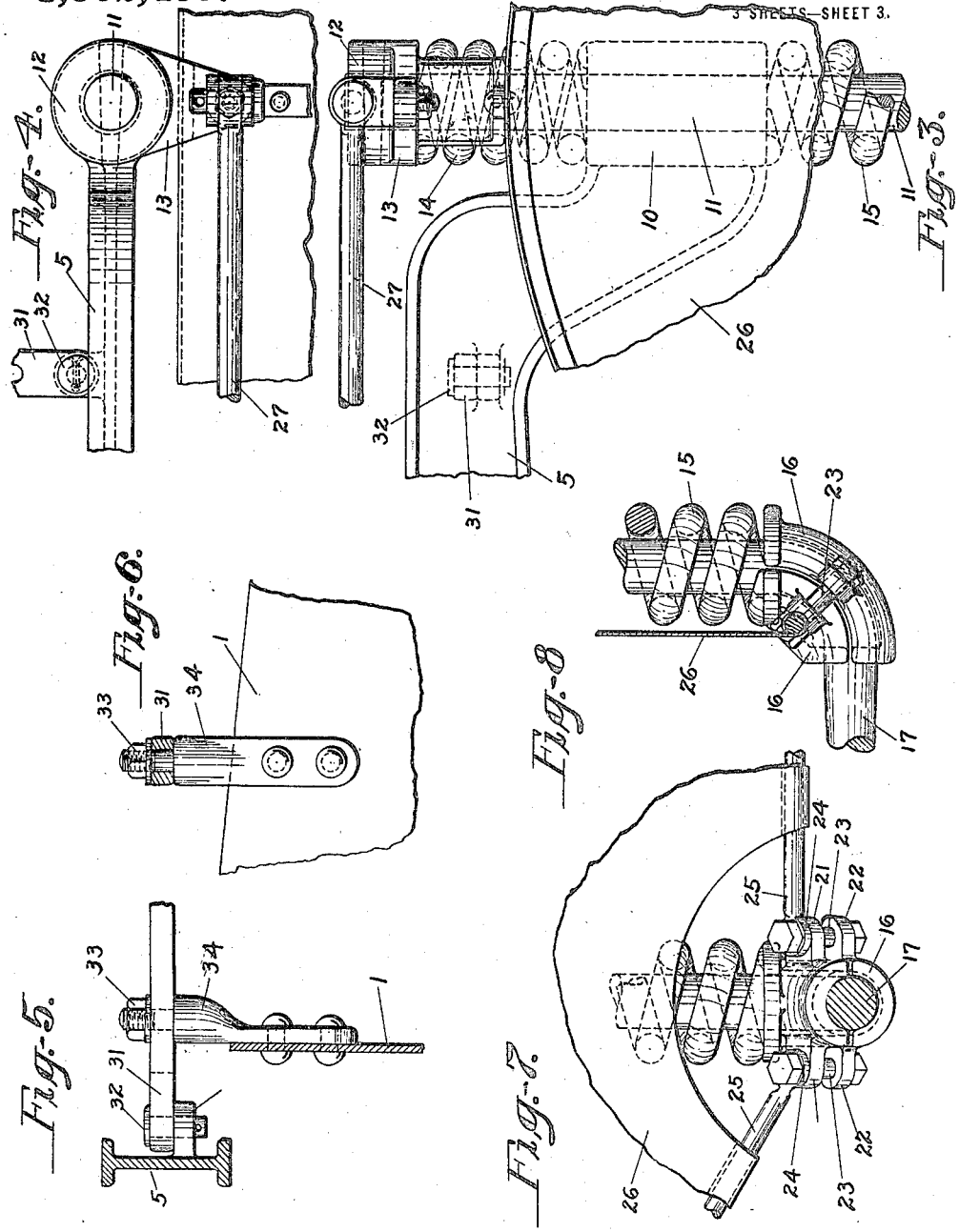

UNITED STATES PATENT OFFICE.

OTIS A. HOLLIS, OF PITTSBURGH, PENNSYLVANIA.

RUNNING-GEAR.

1,302,489.     Specification of Letters Patent.     Patented Apr. 29, 1919.

Application filed February 19, 1918. Serial No. 218,053.

*To all whom it may concern:*

Be it known that I, OTIS A. HOLLIS, a resident of Pittsburgh, in the county of Allegheny and State of Pennsylvania, have invented a new and useful Improvement in Running-Gears, of which the following is a specification.

This invention relates to running gears of vehicles, carriages, tractors, etc.

An object of the invention is to provide means for varying the width of the tread between supporting wheels of the vehicle, and means for widening the tread by moving either one or both of the pair of supporting wheels laterally with respect to the vehicle body independently of the other wheel of the pair. Another object is to provide special supporting means for the wheel, and attaching members from the wheel to the body, permitting the above mentioned adjustment.

Referring to the drawings, Figure 1 is a plan view showing diagrammatically a vehicle body with this invention applied thereto; Fig. 2 is a side elevation of the parts shown in Fig. 1; Fig. 3 is an enlarged partial side elevation similar to Fig. 2; Fig. 4 is a plan of the parts shown in Fig. 3; Fig. 5 is a partial section and elevation showing attachment details; Fig. 6 is a partial section at right angles to that of Fig. 5; Fig. 7 is a partial enlarged section of the wheel carrying spindle, and adjacent parts; and Fig. 8 is a side elevation of the parts shown in Fig. 7.

This invention is applicable to any form of carriage in connection with which it may be desirable to have an adjustable tread width. It is particularly adaptable for the rear wheels of a tractor driven by the front wheels thereof, and adapted to pass between rows of growing plants. In the latter case it is sometimes desirable to have one rear wheel in normal position directly behind the front driving wheel, but in order to give a wider tread to stabilize the tractor, or to extend the tread beyond a row of plants being cultivated, it is advantageous to be able to extend the other supporting wheel laterally away from the carriage body. Especially is this true when the tractor is used upon hillsides, and uneven ground, where with a narrow tread there might be danger of overturning.

Although particularly designed for the above mentioned uses, the invention is applicable to any form of carriage comprising two or more wheels. In the drawings the body or frame of the carriage is indicated as comprising plates 1, forming the side frame, and connected by cross girders 2, riveted to said side members. Oppositely disposed brackets 3 are rigidly attached to the side frames 1 by rivets 4. Swinging cantaliver arms 5, formed in cross section by I-beams, are pivotally mounted in the brackets 3 by means of perforated ears 6 on the arms, dove-tailed with perforated ears 7 on the brackets. A pin 8 passes through the perforations in the two sets of ears and forms a hinged connection permitting the arms 5 to swing freely in a horizontal plane, but preventing movement in any other plane. The brackets 3 also carry a rigid extension or arm 9, further described below.

The outer end of the arm 5 is turned downward, and then outward, carrying a terminal vertical sleeve 10, which slidably engages a vertical shaft 11. The upper end of this shaft has an enlarged terminal head 12, from which extends a rigid arm 13. Between the head 12 and upper end of sleeve 10 a coil spring 14 surrounds the shaft 11. A similar coil spring 15 surrounds the shaft below the sleeve 10. The lower end of the latter spring seats upon a two-part sleeve 16, clamped upon the shaft at a point where it is bent to form a horizontal spindle 17, adapted to act as a journal for the hub 18, of the carriage wheel comprising spokes 19 and rim 20. The two members of the sleeve 16 are clamped upon the shaft by means of projecting lugs 21 and 22, and connecting bolts 23, as clearly shown in Figs. 7 and 8. The heads of bolts 23 also engage flattened terminal portions 24 of bars 25, which form the supporting frame of a fender or mud guard 26, for the vehicle.

The outer end of arm 9, above referred to, has a vertical hole bored therein, and a similar hole is bored in the outer end of the arm 13 on shaft 11. A rigid bar 27 carries pivotally attached to each end thereof a depending member adapted to fit into the bores in the two arms, and to be retained therein by locking pins 29, as shown in Figs. 1 and 4. These locking members are bored to take cotter pins at their smaller ends, for additional safeguard.

On the inner sides of the swinging arms 5 are extensions 30 to which are pivotally attached locking braces 31, by means of pins 32, as shown in Fig. 5. These locking braces are slotted, and through the slot extends the head of locking members 34 riveted to the frame member 1, and having a locking nut 33, above the slot.

The operation and adjustment of the device are as follows:

Normally the rear wheels of the carriage are carried close to the frame as shown at the lower side of Fig. 1. The construction above described permits either one or both of the wheels to be extended any desired distance from the side of the carriage frame, as for example, the wheel shown at the upper part of Fig. 1. This extension is produced by removing the locking pin 29, and raising the outer end of bar member 27 from engagement with the arm 13. As soon as this is done, the wheel may be turned on the shaft 11, so as to point away from the vehicle body, and rolled outward to any desired position. Then it is turned back into parallel relation to the carriage body, and the replacing of the braces 27 in fixed position holds the wheel locked parallel to the carriage body. The nut 33, is then tightened to clamp the brace 31 into locked position relative to the carriage body, and this keeps the supporting arm 5 locked in extended position so as to hold the wheel at the adjusted distance from the carriage body. Thus, by first releasing the brace 27, at either end, by simply removing the locking pin, and then loosening the locking nut 33, the wheel may be rolled outward to any desired position, then turned into proper alinement and locked therein, and in position by simply refastening the end of the bar 27, and by clamping the brace 31 by means of locking nut 33.

The advantages of this adjustable tread construction will be apparent to those familiar with the art. In cases where the ground is soft, there is material advantage in such widening of the tread. For use in hillsides, or in cultivated ground, there is also a distinct benefit to be derived from the construction, in the increased stability of the carriage and the wider covering of ground or road surface.

I claim:

1. The combination with a carriage body having supporting wheels and means to independently adjust the lateral distance of the wheels from the body, of a mounting for said wheels adapted to permit turning the plane of any of the wheels at any angle to the body, and means to lock the wheels in parallel relation to the body at any distance therefrom.

2. The combination with a carriage body of oppositely disposed pivoted arms attached to the body, wheels carried by the free ends of the arms, means to lock the arms in fixed relation to the carriage frame, and means to hold the wheels in parallel relation to the carriage body regardless of the position of the supporting arms.

3. The combination with a carriage body of opositely disposed supporting arms pivotally attached thereto, wheels mounted on vertical shafts at the free ends of the pivoted arms, means to lock the arms in any desired position relative to the carriage body, and detachable means to lock the wheels in parallel position relative to the carriage body regardless of the position of the swinging arm.

4. The combination with a carriage body of supporting arms pivotally attached to the body, vertical shafts slidably carried by the free ends of said arms, coil springs around the vertical shafts above and below their connection to the swinging arms, a horizontal spindle attached to the lower end of the vertical shaft, a wheel thereon, means to lock the arms in adjusted position relative to the carriage body, an arm fixed on the vertical shaft, and a detachable connecting rod leading from said shaft arm to the carriage body whereby to lock the vertical shaft in position to hold the wheel carried thereby parallel to the carriage body, regardless of the position of the swinging arm.

5. The combination with a carriage body of means to extend the supporting wheels laterally from the body, said means comprising a swinging arm pivotally attached to the carriage body and carrying pivotally mounted at its free end a vertical shaft having a spindle thereon for the said wheel, a rigid arm extending from the vertical shaft, a rigid arm extending from the carriage body, and a detachable connection between the said arms, whereby to lock the wheel in parallel relation to the carriage body.

In testimony whereof, I have hereunto set my hand.

OTIS A. HOLLIS.

Witness:
   Jo BAILY BROWN.